US009339966B2

(12) United States Patent
Eleftheriou

(10) Patent No.: US 9,339,966 B2
(45) Date of Patent: May 17, 2016

(54) MACHINE FOR BLOWING MOLDING ARTICLES SUCH AS CONTAINERS

(71) Applicant: Serac group, La Ferte Bernard (FR)

(72) Inventor: Stylianos Eleftheriou, Marly-le-Roi (FR)

(73) Assignee: SERAC GROUP, La Ferte Bernard (FR)

( * ) Notice: Subject to any disclaimer, the term of this patent is extended or adjusted under 35 U.S.C. 154(b) by 0 days.

(21) Appl. No.: 14/664,173

(22) Filed: Mar. 20, 2015

(65) Prior Publication Data

US 2015/0266228 A1 Sep. 24, 2015

(30) Foreign Application Priority Data

Mar. 21, 2014 (FR) ...................................... 14 52407

(51) Int. Cl.
| | |
|---|---|
| B29C 49/00 | (2006.01) |
| B29C 49/42 | (2006.01) |
| B29C 65/08 | (2006.01) |
| B29B 11/02 | (2006.01) |
| B29B 11/04 | (2006.01) |
| B29C 49/02 | (2006.01) |
| B29C 49/78 | (2006.01) |
| B29C 65/00 | (2006.01) |
| B29C 53/52 | (2006.01) |
| B29K 105/00 | (2006.01) |
| B29C 49/08 | (2006.01) |

(52) U.S. Cl.
CPC ............. *B29C 49/0047* (2013.01); *B29B 11/02* (2013.01); *B29B 11/04* (2013.01); *B29C 49/02* (2013.01); *B29C 49/4236* (2013.01); *B29C 49/78* (2013.01); *B29C 53/52* (2013.01); *B29C 65/08* (2013.01); *B29C 66/022* (2013.01); *B29C 66/1142* (2013.01); *B29C 66/4312* (2013.01); *B29C 66/8322* (2013.01); *B29C 66/851* (2013.01); *B29C 49/08* (2013.01); *B29C 2049/0052* (2013.01); *B29K 2105/258* (2013.01)

(58) Field of Classification Search
CPC ................... B29C 2049/0052; B29C 49/0047; B29C 66/022; B29C 66/851; B29C 66/1142; B29C 66/8233; B29C 65/08; B29C 49/78; B29C 49/4236; B29B 11/04; B65B 3/022
See application file for complete search history.

(56) References Cited

U.S. PATENT DOCUMENTS

| | | | | |
|---|---|---|---|---|
| 3,505,705 A | * | 4/1970 | Stroop | B29C 49/0047 156/500 |
| 5,813,197 A | * | 9/1998 | Aguzzoli | B29C 49/0047 53/433 |

(Continued)

FOREIGN PATENT DOCUMENTS

| | | |
|---|---|---|
| FR | 2851227 | 8/2004 |
| WO | WO 9419240 | 9/1994 |

*Primary Examiner* — Robert B Davis
(74) *Attorney, Agent, or Firm* — Muncy, Geissler, Olds & Lowe, P.C.

(57) ABSTRACT

A machine is provided for blow-molding articles from a strip of material. The machine has a mount with two frames mounted thereon. Each frame is connected to a movement actuator so as to be movable along a path of the strip between respective positions that are upstream and downstream relative to a travel direction of the strip through the machine. A pipe, a holder member, and a mold are mounted respectively on an item selected from the mount and the frames. A control unit is connected to the movement actuators to control them in such a manner as to generate a sequence of moving the guide pipe and the mold relative to the holder member and of opening and closing the mold in such a manner as to cause the strip to advance along the rectilinear path.

17 Claims, 12 Drawing Sheets

(56) References Cited

U.S. PATENT DOCUMENTS

| | | | |
|---|---|---|---|
| 8,388,886 B2* | 3/2013 | Wilkes | B65D 1/0223 264/523 |
| 2011/0303673 A1 | 12/2011 | Wilkes | |
| 2015/0096957 A1* | 4/2015 | Etesse | B29C 49/0047 215/355 |
| 2015/0203236 A1* | 7/2015 | Etesse | B29C 49/0047 215/43 |

\* cited by examiner

MACHINE FOR BLOWING MOLDING ARTICLES SUCH AS CONTAINERS

BACKGROUND OF THE INVENTION

1. Field of the Invention

The present invention relates to the field of packaging, and more particularly to a machine for blow-molding articles such as containers.

2. Brief Discussion of the Related Art

Documents FR-A-2 851 227 and WO-A-2010/007004 disclose a method and a machine for blow-molding containers that are made from a strip of thermoformable material. The method is based on shaping the strip into a tube that is heated and then inserted into a mold. Air injected into the tube enables it to be deformed so as to press its wall against the inside surface of the mold cavity. That method is easier to implement than an extrusion blow-molding method and it enables a wider variety of shapes to be obtained than a conventional thermoforming method. In addition, the use of material in strip form and the limited stretching of the material make it possible to use a multilayer material.

The machine described in those documents comprises a mount having mounted thereon in succession along a rectilinear path for the strip through the machine: a blowpipe connected to an air manifold member and extending coaxially about a longitudinal direction of the strip; a shaper arranged around the blowpipe to bring the longitudinal edges of the strip close to each other in order to shape the strip into a tube around the blowpipe; a welder member for welding together the adjacent edges of the strip shaped as a tube; at least one heater member for heating the strip; a mold having two portions that are movable relative to each other; and a drive device for driving the strip along its longitudinal direction. The blower member, the welder member, the heater member, the mold, and the drive device are connected to a control unit that is arranged to control them in such a manner as to perform the blow-molding method.

It has been found that the performance of the machine depends very strongly on the regularity with which the material advances through the machine, with this applying both in terms of productivity and in terms of the quality of the containers that are obtained, in particular when the strip of material is printed.

Unfortunately, in that machine, the material is present in the form of segments that alternate between being flexible and rigid, namely:

a relatively flexible segment when the material is in the form of a strip;

a relatively rigid segment when the material is in the form of a tube upstream from the heater member;

a relatively flexible segment when the strip is in the form of a tube downstream from the heater member; and once more a relatively rigid segment after blow-molding.

This alternation makes driving the material more complicated, in particular when a relatively high speed of advance is desired for the material through the machine, or when the strip is printed. It is necessary to avoid giving rise to excessive stretching of the flexible segments and to avoid forming creases therein.

SUMMARY OF THE INVENTION

An object of the invention is to provide means suitable for increasing the performance of such machines in terms of productivity and/or quality.

To this end, the invention provides a machine for blow-molding articles from a strip of material, the machine comprising a mount having mounted thereon in succession along a rectilinear path of the strip through the machine: a guide pipe coaxial about a longitudinal direction of the strip; a shaper arranged around the guide pipe to bring the longitudinal edges of the strip close to each other in order to shape the strip into a tube around the guide pipe; a welder member for welding together adjacent edges of the strip shaped as a tube; at least one heater member for heating the strip; and a mold having two portions movable relative to each other. The machine further includes a device for driving the strip along its longitudinal direction and a blower member connected to an air manifold member for deforming the tube inside the mold and for pressing the tube against a cavity of the mold. The blower member, the welder member, the heater member, the mold, and the drive device are connected to a control unit for controlling them. The drive device comprises at least one member for longitudinally holding the strip and two frames mounted on the mount and each connected to a movement actuator so as to be movable along the path of the strip, each being movable between an upstream position and a downstream position relative to a movement direction of the strip through the machine, and the pipe, the holder member, and the mold are respectively mounted on one item selected from the mount and the frames, and the control unit is connected to the movement actuators to control them in such a manner as to generate a sequence of moving the guide pipe and the mold relative to the holder member and of opening and closing the mold in such a manner as to cause the strip to advance along the rectilinear path.

Thus, the strip shaped as a tube is gripped downstream from the blower member by the mold and the guide pipe is moved together with the strip of material, in particular upstream from the blower member, in order to enable the strip to move through the machine along the defined path. This makes it possible to limit any risk of the strip shaped as a tube deforming as it is driven along the path, and thus improves the accuracy with which it is moved.

In a particular embodiment of the invention, the guide pipe is secured to the first frame, the holder member is secured to the mount, and the mold is secured to the second frame, the control unit being arranged in such a manner that:

the first frame and the second frame are taken simultaneously from their upstream positions towards their downstream positions after closure of the mold;

the first frame is returned towards its upstream position before the mold is opened; and the second frame is returned towards its upstream position after the mold is opened.

The shaper member is then preferably mounted on the first frame.

Advantageously, the machine includes at least one presser mounted on the mount to be movable transversely relative to the guide pipe between a retention position for retaining the strip shaped as a tube, and a release position for releasing the strip shaped as a tube.

The presser is no longer in contact with the strip shaped as a tube when the first frame is returned to the downstream position, thereby further limiting any risk of damage to the strip.

Preferably, the guide pipe incorporates longitudinally a go-and-return channel having an inlet and an outlet connected to a temperature regulator device including a heat transfer fluid circuit.

It is thus possible to regulate the temperature of the guide pipe and thus of the strip shaped as a tube in such a manner as to ensure that the temperature is optimized for blow-molding.

In a particular embodiment, the guide pipe has a central duct connected to the blower member and the go-and-return channel then advantageously comprises two annular ducts that are coaxial about the central duct.

The guide pipe remains relatively simple to make.

According to a particular characteristic, the machine includes at least one sealing element between the strip shaped as a tube and the guide pipe at the inlet to the mold, and the sealing element is preferably a diaphragm.

The sealing element can then clamp against the strip shaped as a tube at the mold in order to provide sealing. The use of a diaphragm makes it possible to apply circumferential clamping to an annular portion of the strip shaped as a tube. Although such circumferential clamping can leave marks on the clamped annular portion, it does not give rise to creases that could spoil the appearance of a container or that could impede subsequent operations of processing the article, such as a closing operation when the article is a container.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE PREFERRED EMBODIMENTS

Figure 1:
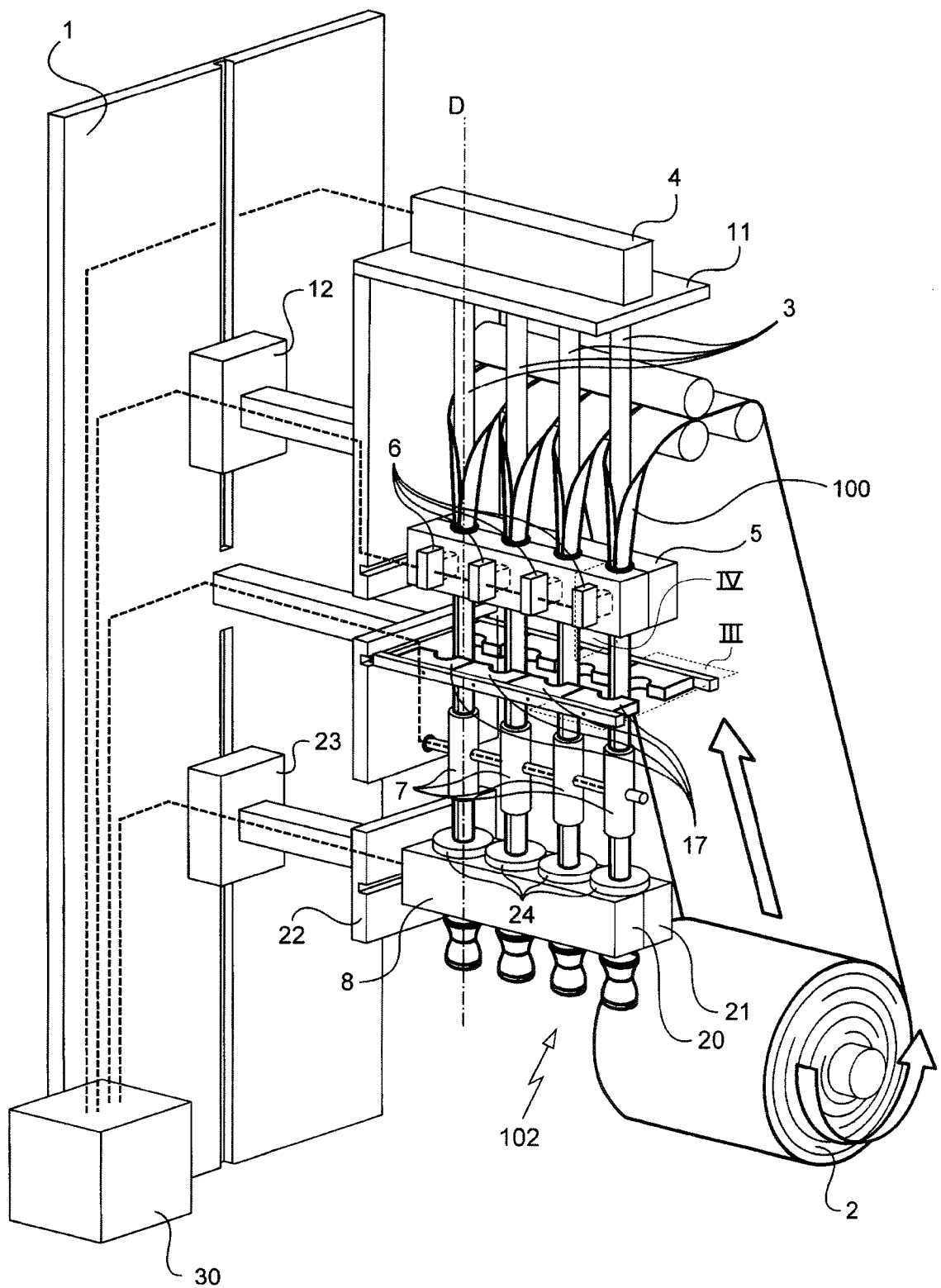
FIG. 1 is a diagrammatic perspective view of a machine in a first embodiment of the invention.
Figure 2:
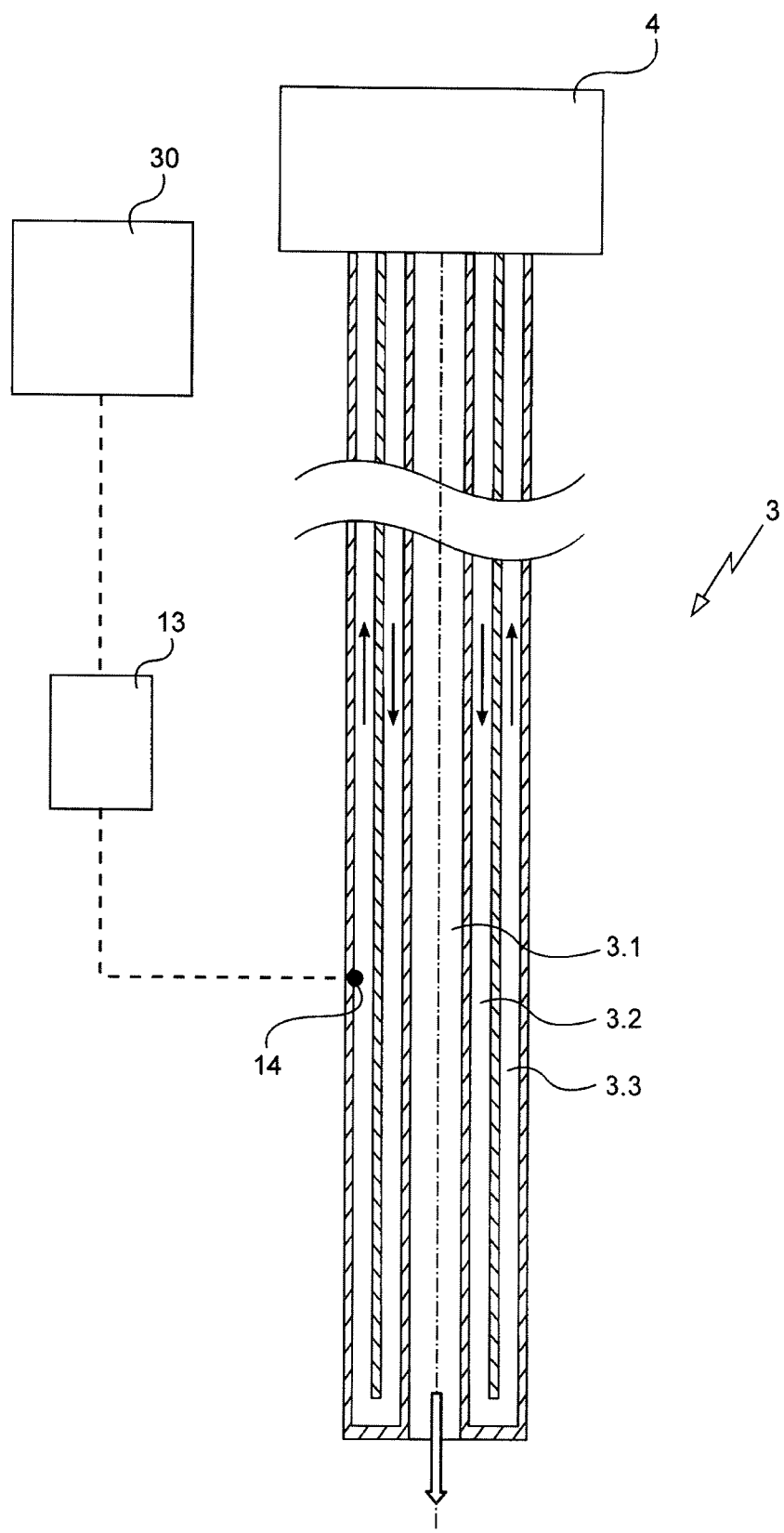
FIG. 2 is a longitudinal section view of a guide pipe of the machine.
Figure 3:
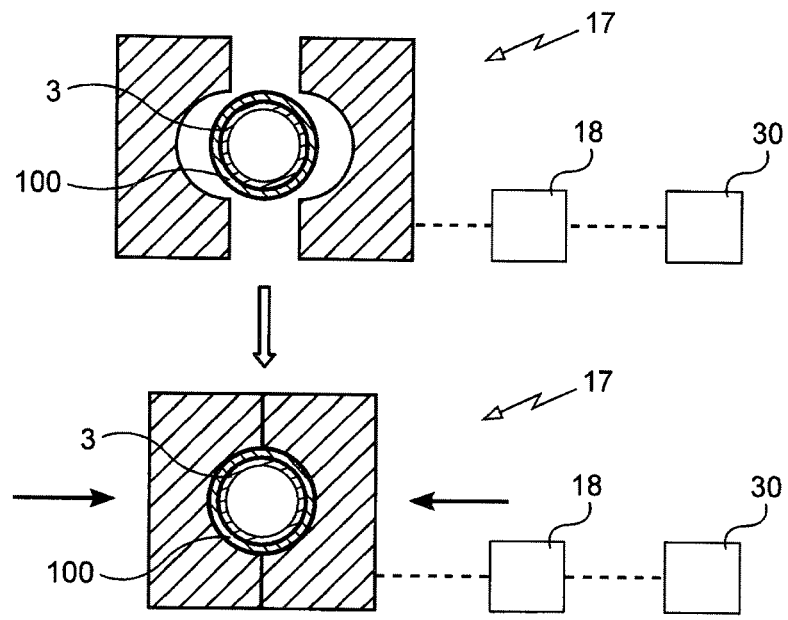
FIG. 3 is a diagrammatic section view on line III-III of FIG. 1 showing the presser in its two positions.
Figure 4:
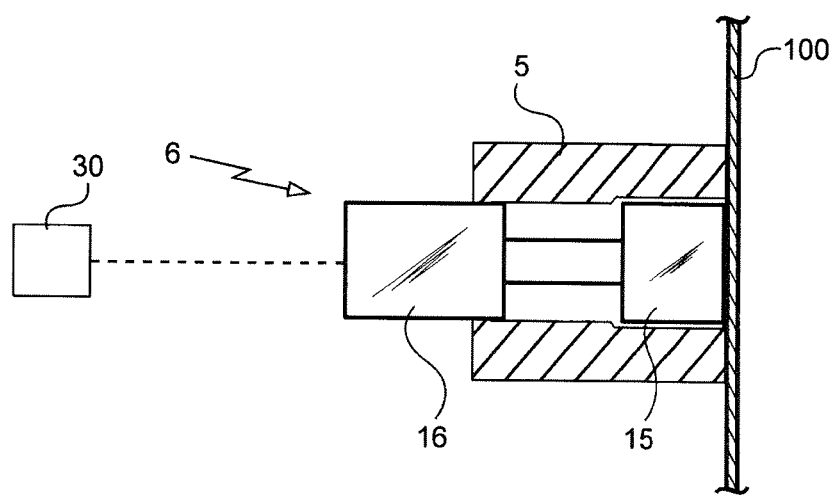
FIG. 4 is a diagrammatic section view on line IV-IV of FIG. 1 showing the welding unit of the machine.
Figure 5:
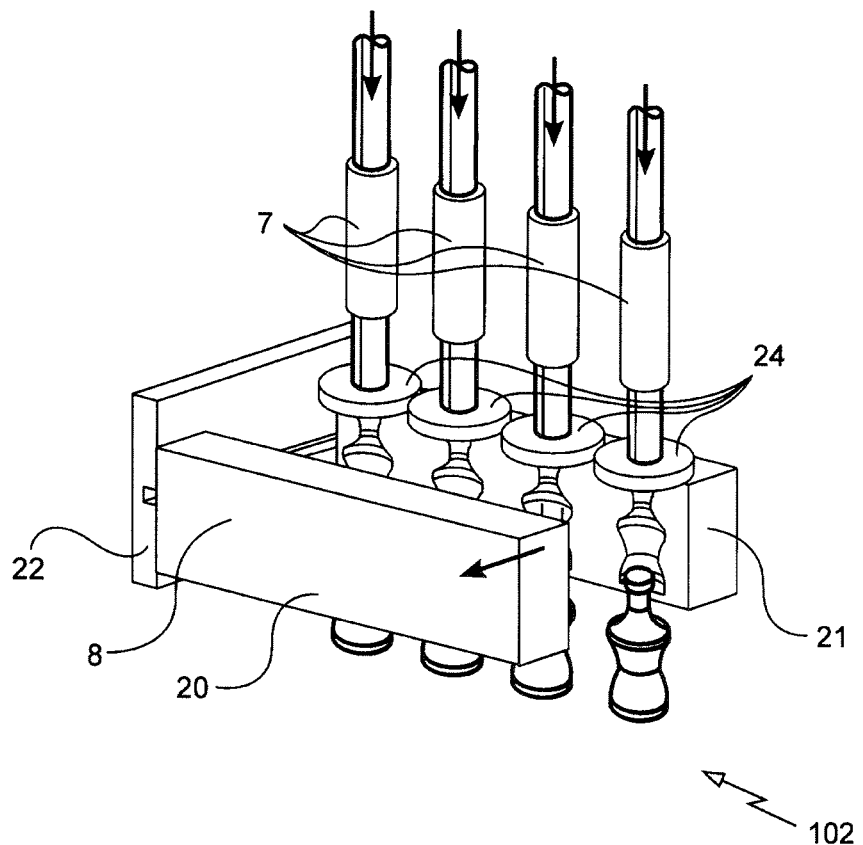
FIG. 5 is a perspective view of the mold in the open position.

With reference to the figures, the machine of the invention is described herein in an application to fabricating containers. The machine described herein is more particularly arranged for performing the method described in Documents FR-A-2 851 227 and WO-A-2010/007004.

In this method, the containers are obtained by blow-molding a strip of thermoformable material.

With reference to the figures, the machine of the invention comprises a mount given overall reference 1 that is substantially in the form of a rectangular block extending in a substantially vertical direction. The mount 1 defines a path through the machine for the strip of thermoformable material 100 going from a roll 2 for unwinding a wide strip from which the strip 100 is cut out, to an outlet for containers 102 from the machine. In this example, the machine has four adjacent blow-molding units each fed with a respective strip 100 cut out from the wide strip being unwound from the roll 2.

For each blow-molding unit, there are mounted on the mount 1 in succession along a rectilinear segment of the path followed by the strip 100 through the machine:

a guide pipe 3 that is connected to an air manifold member 4 to form a blower member extending coaxially around a longitudinal direction D of the strip 100;

a shaper 5 for shaping the strip 100 into a tube around the guide pipe 3;

a welder member 6 for welding together the adjacent edges of the strip 100 shaped into a tube;

at least one heater member 7 for heating the strip 100; and a mold 8.

In this example the air manifold member 4 is an electrically controllable manifold having one port connected to the guide pipe and another port connected to a pressurized pneumatic circuit including a supply of air under pressure fed by a compressor.

The heater member 7 is stationary relative to the mount 1. In this example the heater member 7 is formed by a tunnel having infrared lamps arranged therein with the tube-shaped strip passing in front of them.

The guide pipe 3, the shaper 5, and the welder member 6 are mounted on a first frame 11 that is itself mounted on the mount and connected to a movement actuator 12 so as to be movable along the path of the strip 100 between respective positions that are upstream and downstream relative to a direction in which the strip 100 moves through the machine.

The guide pipe 3 has one end fastened to the first frame 11 and an opposite end that is free. The guide pipe 3 has a central duct 3.1 connected to the air manifold member 4 and a go-and-return channel comprising two annular ducts 3.2 and 3.3 arranged coaxially around the central duct 3.1. The ducts 3.1, 3.2, and 3.3 are coaxial with the guide pipe 3. The annular ducts 3.2 and 3.3 are connected to each other at the free end of the guide pipe 3, the annular duct 3.2 is connected to an inlet of a heat transfer fluid circuit of a temperature regulator device 13, and the annular duct 3.3 is connected to an outlet of the heat transfer fluid circuit so that the annular channels 3.2 and 3.3 form a go-and-return channel. The heat transfer fluid may be oil or water, and temperature regulation is performed so as to maintain the guide pipe at a temperature appropriate for blowing (in particular in order to avoid it cooling between the heater member 7 and the mold 8), and/or to avoid excessive heating of the surface of the guide pipe 3, in particular in the oven (the heat transfer fluid is selected as a function of its suitability for performing one and/or the other of these functions). The regulator device 13 includes a heater member, in this example a heater resistor or a heat exchanger, enabling the heat transfer fluid to be maintained at the temperature appropriate for the intended purpose, and a temperature probe 14 that is connected to the temperature regulator device 13 and that is secured to the guide pipe 3.

In this example, the welder member 6 has a welding head 15 secured to an ultrasound generator 16 mounted on the first frame 11 to be movable transversely relative to the path of the strip 100 between an active position for welding in which the welding head 15 is applied against the longitudinal edges of the strip 100 that have been moved close together by the shaper 5, and an inactive position in which the welding head 15 is spaced apart from the longitudinal edges. The welder member 6 is moved between its two positions by an actuator.

The shaper 5 is mounted on the first frame 11 and has jaws that are driven by an actuator between open and closed positions and that have respective substantially semicylindrically-shaped cavities arranged around the guide pipe 3 in order to bring the longitudinal edges of the strip 100 close to each other so as to put the strip into the shape of a tube around the guide pipe 3 and in order to take hold of the strip in the form of a tube. The cavity could have any other shape appropriate for shaping the strip into a tube.

For reasons of compactness and simplicity, the welder member 6 in this example is mounted directly on one of the jaws of the shaper 5.

A presser 17 is mounted on the mount 1 in order to be movable transversely to the guide pipe 3 between a retention position for retaining the strip in the form of a tube, and a release position for releasing the strip in the form of a tube. In the retention position, the presser 17 is pressed against the strip in the form of a tube, and in the release position, the presser 17 is spaced apart from the strip in the form of a tube. The presser 17 is arranged to clamp circumferentially against the strip shaped as a tube without clamping the guide pipe 3 (the guide pipe 3 preferably has a constriction in section in register with the presser 17 so as to prevent the guide pipe 3 being clamped). The presser 17 is carried by an actuator 18 mounted on the mount 1 between the welder member 6 and the heater member 7.

The mold 8 has a recess arranged to enable a container to be molded. Preferably, the mold does not separate the container from the remainder of the strip shaped as a tube since that enables the strip shaped as a tube to be stabilized laterally (the weight of the containers exerts downward traction on the strip shaped as a tube), and thus provides better guidance of the strip shaped as a tube. This separation is performed later on. The mold 8 is mounted on a second frame 22 that is mounted on the mount 1 and that is connected to a movement actuator 23 in order to be moved along the path of the strip 100. The second frame 22 is thus movable between an upstream position and a downstream position relative to the movement direction of the strip through the machine. The distance between the upstream and downstream positions of the second frame 22 is equal to the distance between the upstream and downstream positions of the first frame 11. The mold 8 has two portions 20 and 21 that are movable relative to each other between a closed position for molding containers and an open position enabling a shaped container to be discharged. The mold 8 is provided with superposed diaphragms 24 to constitute respective sealing elements between each tube-shaped strip and the mold 8. In conventional manner, each diaphragm 24 comprises blades assembled on a support ring in order to define a central through orifice for the guide pipe 3 supporting the strip shaped as a tube. The blades are movable relative to one another between a closed position in which the central orifice has a diameter slightly smaller than the outside diameter of the strip shaped as a tube, and an open position in which the central orifice has a diameter greater than the outside diameter of the strip shaped as a tube. The diaphragms 24 are offset angularly relative to one another around the guide pipe 3 in order to improve the sealing obtained by the set of diaphragms 24. The diaphragms 24 are secured to an annular support fastened to the mold 8. By way of example, the annular support comprises a bottom collar received removably in a groove formed in the mold portion.

The air manifold member 4, the welder member 6, the heater member 7, the mold 8, the regulator device 13, and the actuators are connected to a control unit 30 that is arranged to control them.

The control unit 30 is connected to the actuators for moving the frames 11 and 22 in order to control them in such a manner that:

the first frame 11 and the second frame 22 are taken simultaneously from their upstream positions towards their downstream positions after the mold 8 has been closed;

the first frame 11 is returned towards its upstream position after the diaphragms 24 have opened and before the mold 8 is opened; and the second frame is returned towards its upstream position after the mold 8 has been opened.

The actuator 18 is connected to the control unit 30 so that the presser 17 is in the release position when the first frame 11 is taken from its upstream position towards its downstream position, and is in its application position when the first frame 11 is taken from its downstream position towards its upstream position.

The welder member 6 and the actuator of the welder member 6 are connected to the control unit 30 so that welding takes place while the first frame 11 is being taken from its upstream position towards its downstream position. The actuator is thus controlled so that the welding head 15 is taken into its active position while the first frame 11 is in its upstream position, and it is held in its active position throughout all or part of the time taken for the first frame 11 to move towards its downstream position. The actuator is controlled to bring the welding head 15 into its inactive position before the first frame 11 is moved from its downstream position towards its upstream position.

The portions of the mold 8 and the diaphragms 24 are brought into their closed position when the second frame 22 is in its upstream position, and they are held in their closed position until the second frame 22 is in its downstream position. The portions of the mold 8 and the diaphragms 24 are brought into their open position before the second frame 22 is moved towards its upstream position.

Figure 6:
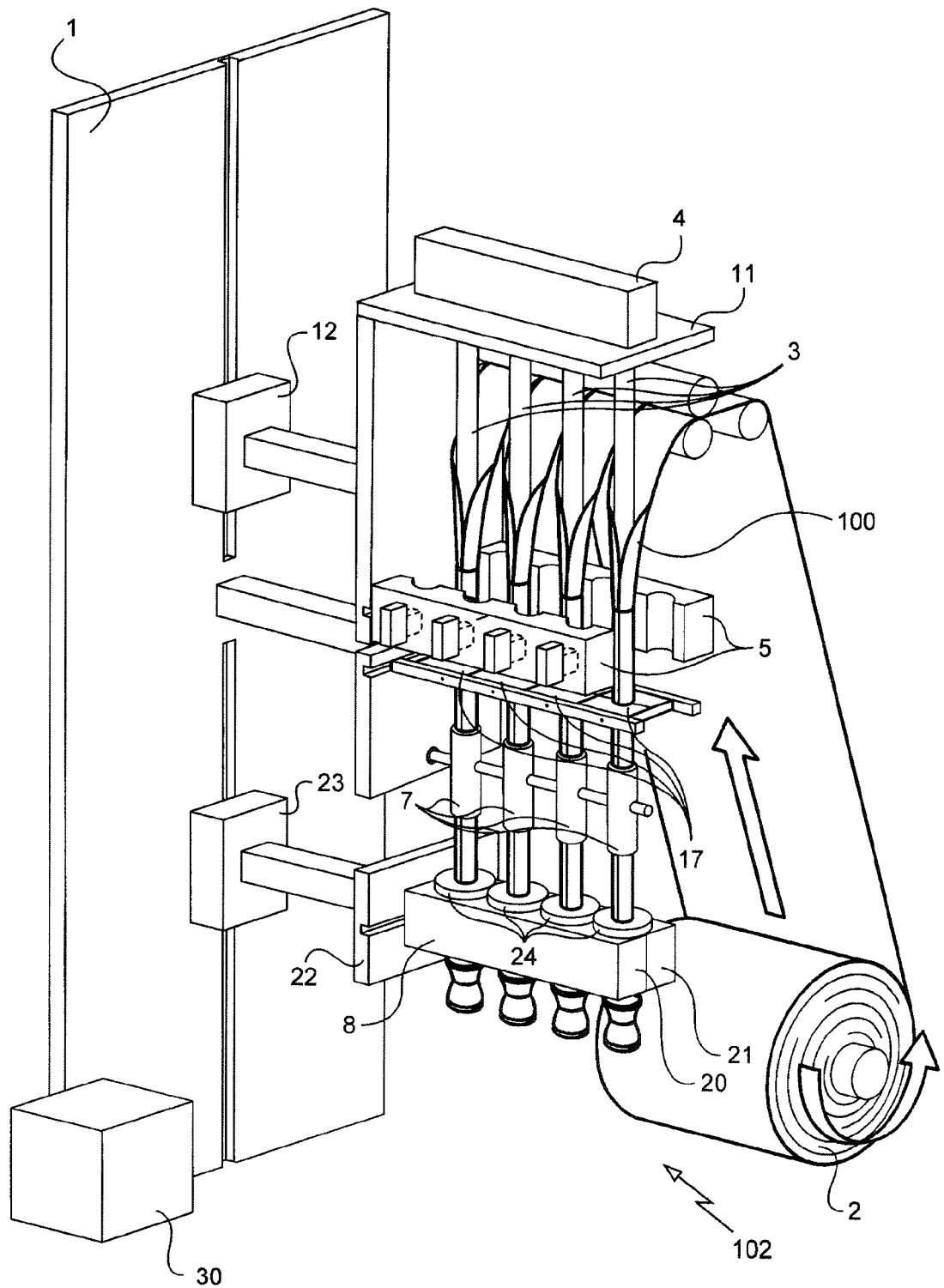
FIGS. 6 to 8 are diagrammatic elevation views showing the various positions of the frames during operation of the machine.
Figure 7:
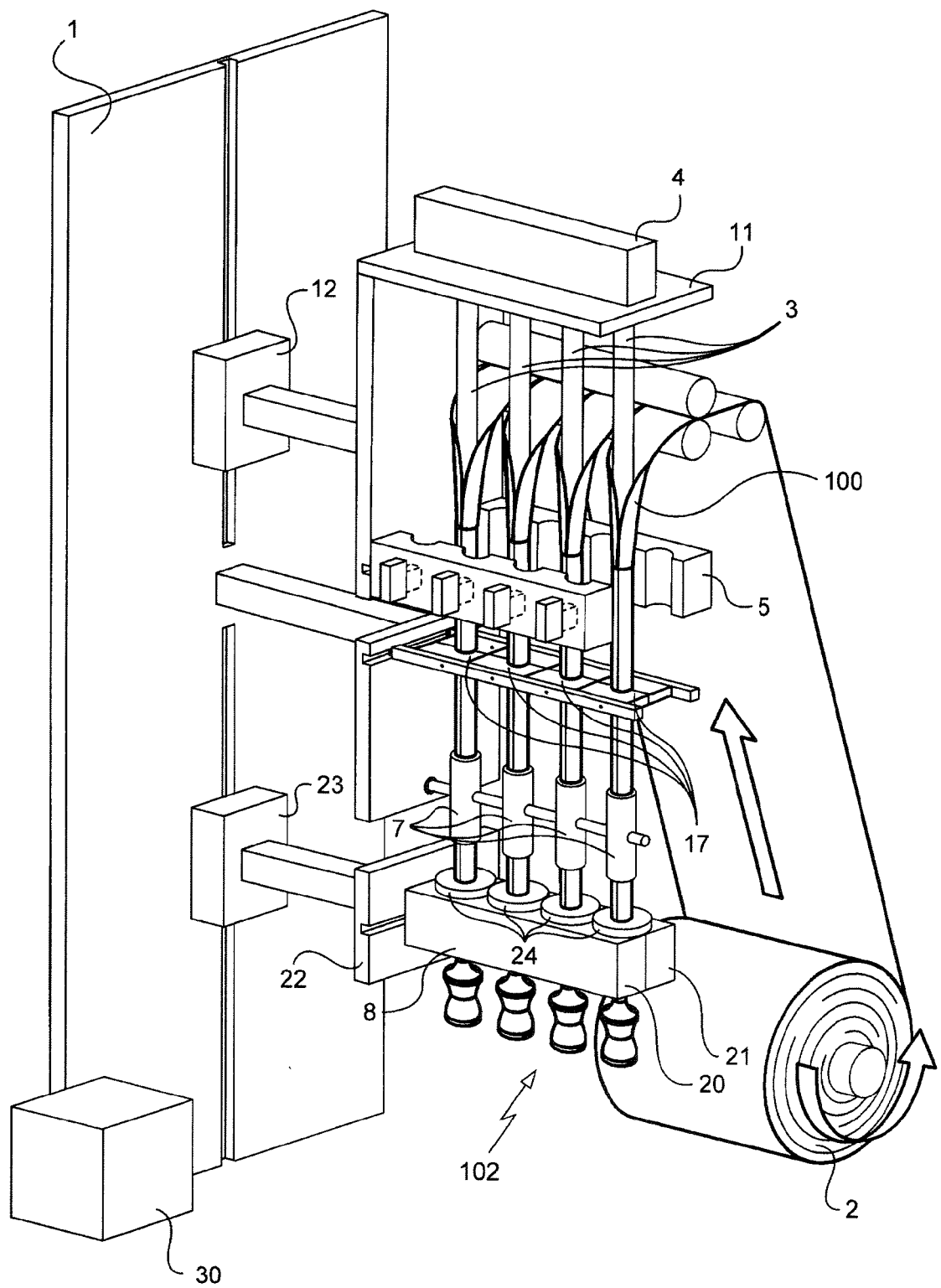
Figure 8:
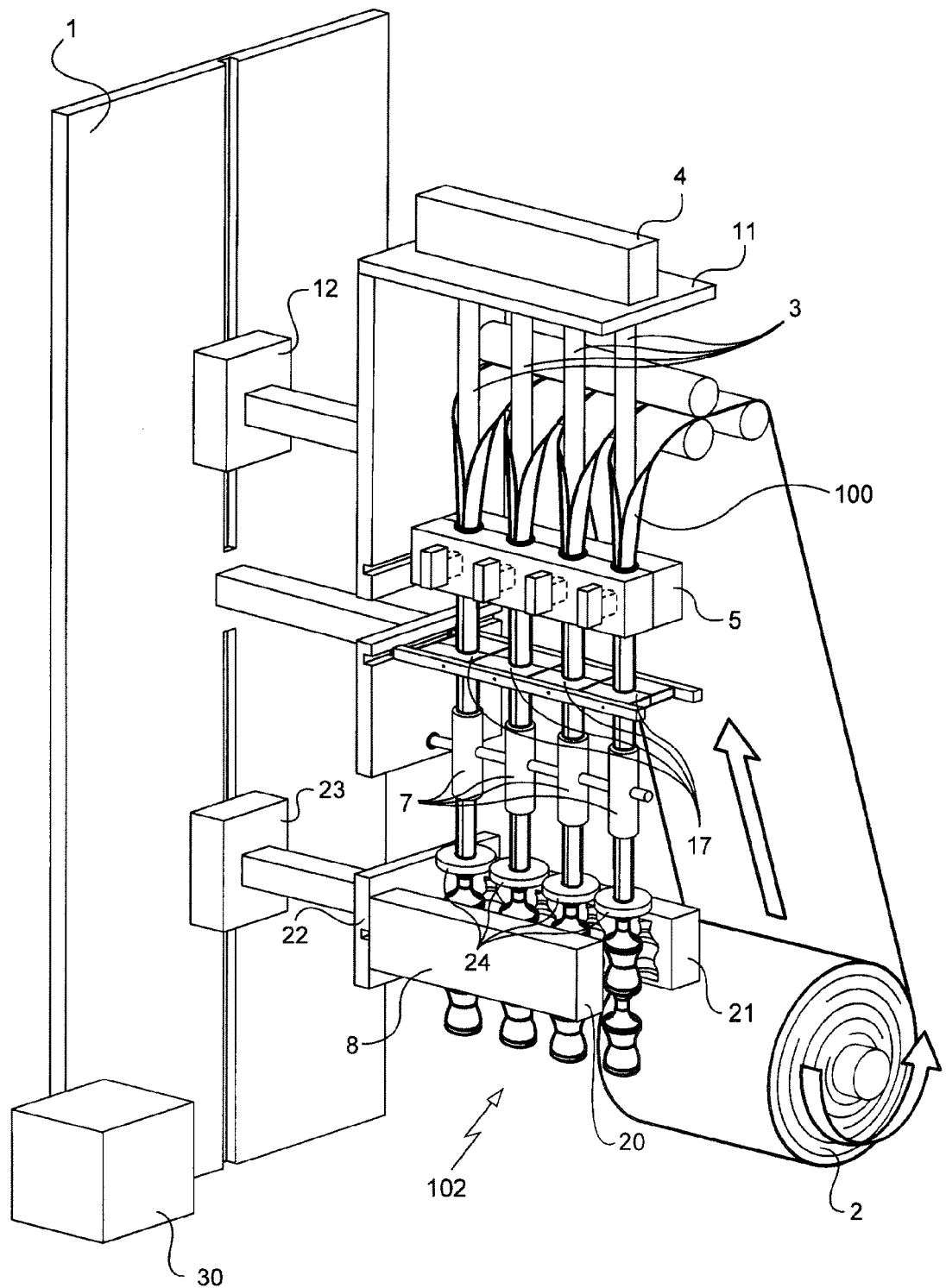
Figure 9:
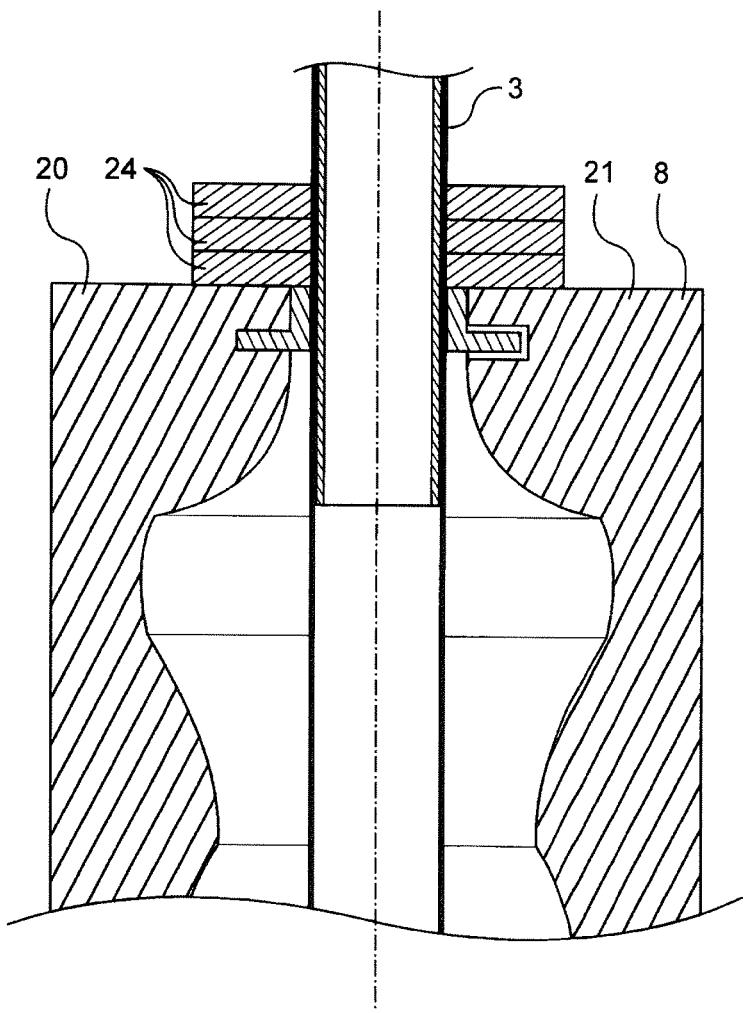
FIG. 9 is a fragmentary section view of the mold in the closed position.

In summary, the operating cycle of the machine takes place as follows:

the frames 11 and 22 are in the high position, the shaper 5 has been closed in order to begin welding, the presser 17 is in its release position, and the mold 8 is closed (FIG. 1);

welding and blowing begin when the frames 11 and 22 begin to be moved towards their downstream positions;

welding and blowing stop when the frames 11 and 22 are in the downstream position (FIG. 6), the shaper 5 is then opened and the presser 17 is brought into its retaining position; simultaneously the container is vented;

the first frame 11 is then taken towards its upstream position after the diaphragms 24 have been opened (FIG. 7);

once the first frame 11 has reached the upstream position (FIG. 8), the mold 8 is opened and the shaper 5 is closed so that welding can begin, starting from this instant if necessary; and the second frame 22 is then raised to the upstream position, the mold 8 is closed as are the diaphragms 24, and the presser 17 is returned to the release position in order to put the machine into its state for beginning a new cycle (situation shown in FIG. 1).

The strip shaped into a tube is heated continuously.

Figure 10:
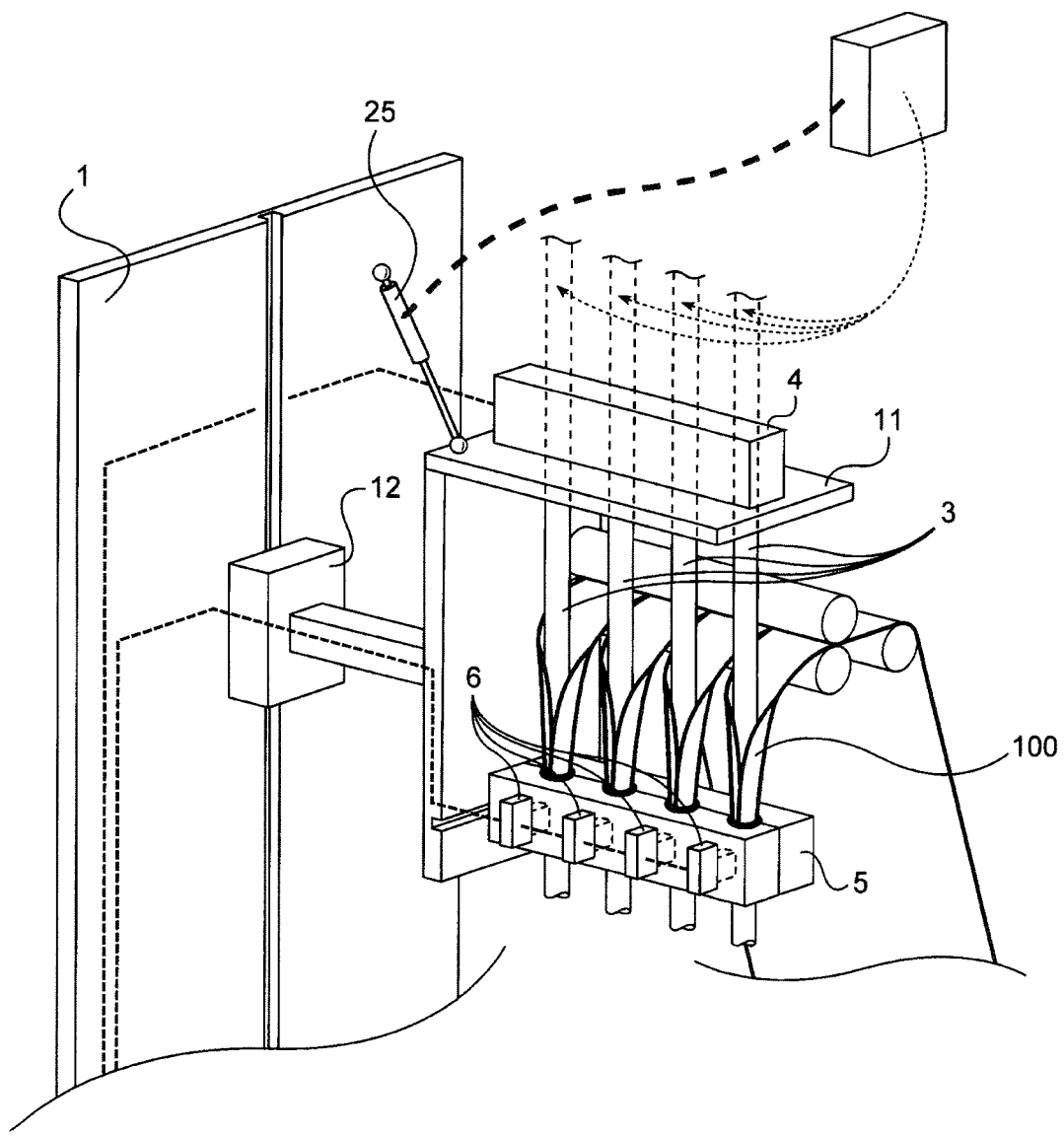
FIG. 10 is a fragmentary perspective view of the top portion of the machine.

The machine includes compensation means for compensating a volume left empty in the strip shaped as a tube when the first frame 11, and thus the guide pipe 3, is taken from its downstream position to its upstream position. During this movement, the guide pipe 3 releases a certain volume in the strip shaped as a tube. In this example, the compensation means enable this volume to be filled with air progressively as it is released by the guide pipe 3. For this purpose, the compensation means comprise an actuator 25 (visible in FIG. 10) having a body hinged to the mount 1, a rod hinged to the first frame 11, and a rear chamber connected to the air manifold member 4 in such a manner that the relative movement between the guide pipe 3 and the presser 17 causes a volume of air to be injected into the strip shaped as a tube, which volume is substantially equal to the volume left empty in the strip shaped as a tube during the movement of the guide pipe 3. It can be understood that when the first frame 11 moves upwards, it causes the rod of the actuator 25 to be retracted, thereby expelling air from the rear chamber of the actuator 25, with this air being reinserted into the air manifold member 4 and then into the strip shaped as a tube via the guide pipe 3. If there is one compensation actuator per blow-molding unit, then the inside section of the actuator body 25 is selected so that the product of the inside section of the actuator multiplied by the stroke of the rod between the upstream and downstream positions of the first frame 11 is equal to the volume that is left empty in the strip shaped as a tube by the guide pipe during the movement of the first frame 11 from the downstream position towards the upstream position. In this example, since the actuator 25 is common to all four blow-molding units, its inside section is selected in such a manner that the product of the inside section of the actuator 25 multiplied by the stroke of the rod between the upstream and downstream positions of the first frame 11 is equal to four times the volume left empty in the strip shaped as a tube by any one of the guide pipes 3 during the movement of the first frame 11 from the downstream position to the upstream position.

Figure 11:
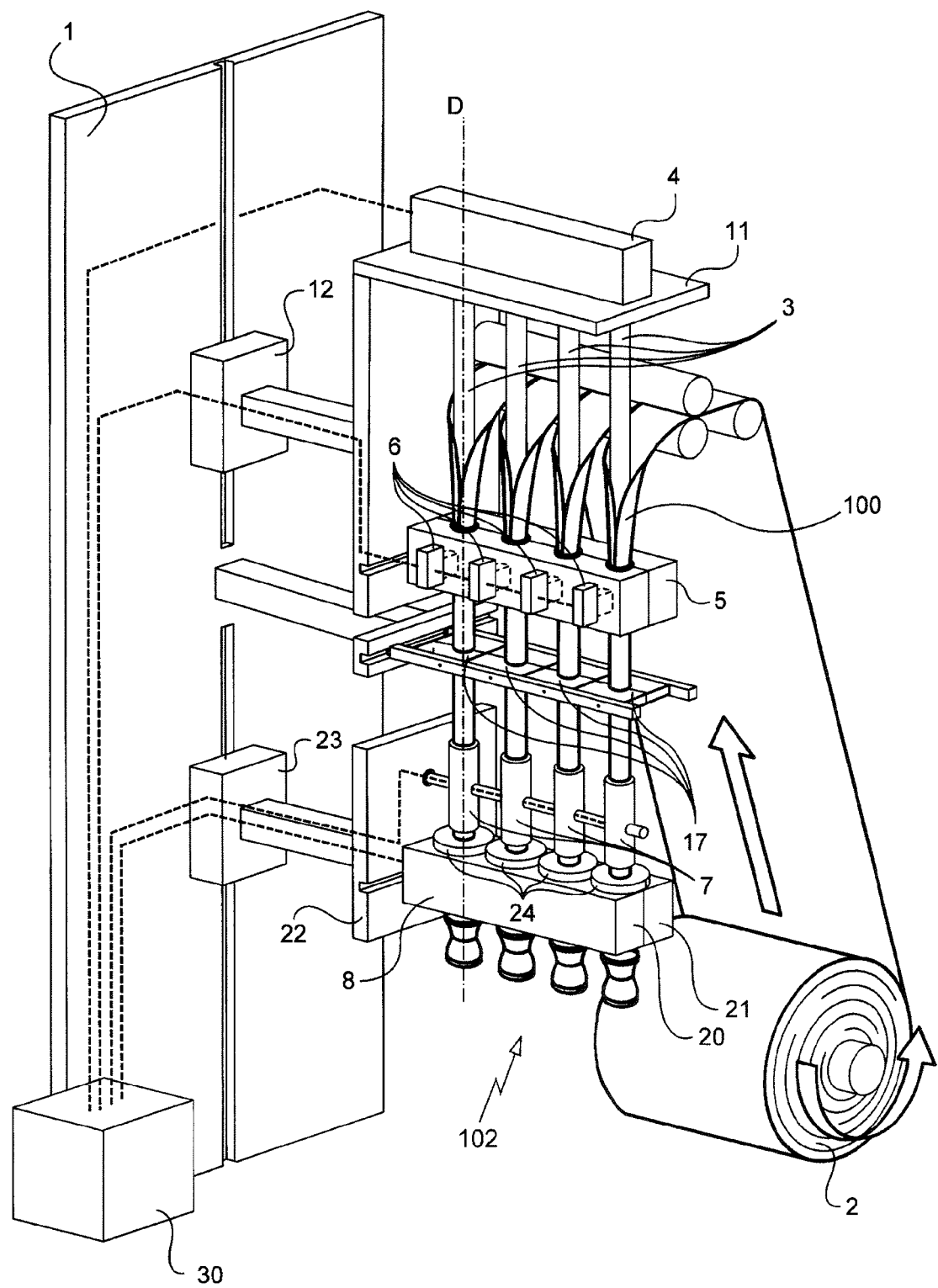
FIG. 11 is a view analogous to FIG. 1 of a machine in a variant of the first embodiment.

In the variant of FIG. 11, the heater member 7 is not fastened to the mount 1, but to the second frame 22. This enables the heater member 7 to be brought closer to the mold 8. In addition, some of the heating may be performed on a segment of the strip shaped as a tube that is released by the guide pipe 3 when the first frame 11 is in the upstream position and the second frame 22 is in the downstream position: heating can then be more effective.

Figure 12:
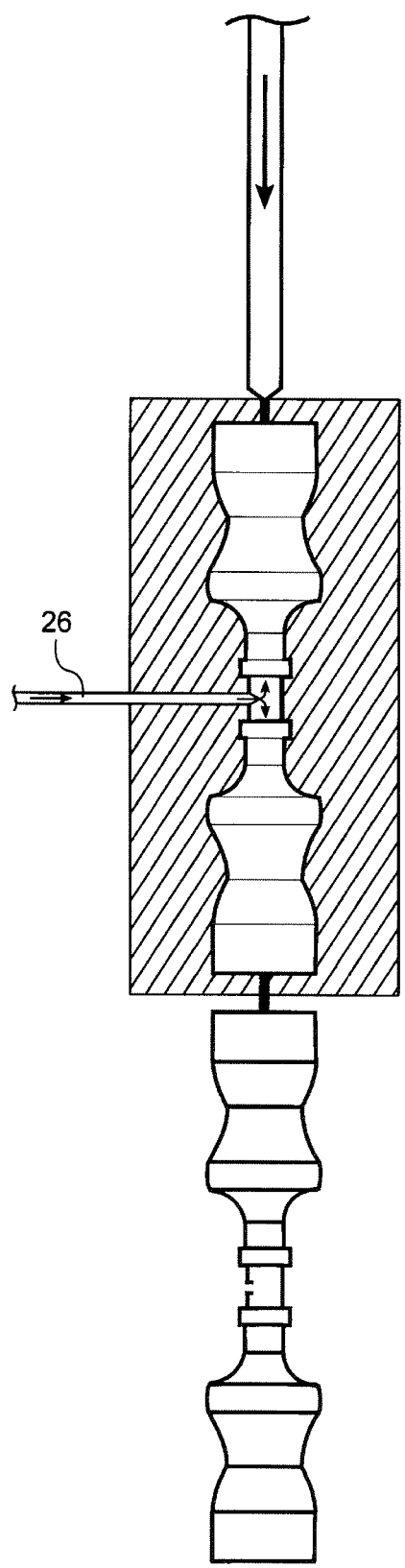
FIG. 12 is an axial section view of a mold of a machine in a second embodiment of the invention.

In the second embodiment shown in FIG. 12, the guide pipe 3 is not used as a blower member.

In this embodiment, the mold 8 has a cavity shaped to make two containers head to head that are united via their necks by a tubular junction wall. The mold has a hollow needle 26 with one connected to the air manifold member 4 and a pointed end projecting into a mold portion in order to act when the mold is closed to pierce the strip shaped as a tube through the tubular junction wall. Air injection takes place through the tubular junction wall.

As above, the mold 8 is arranged in such a manner that the pair of containers that are formed are not separated from the remainder of the strip shaped as a tube. This separation takes place subsequently.

Figure 13:
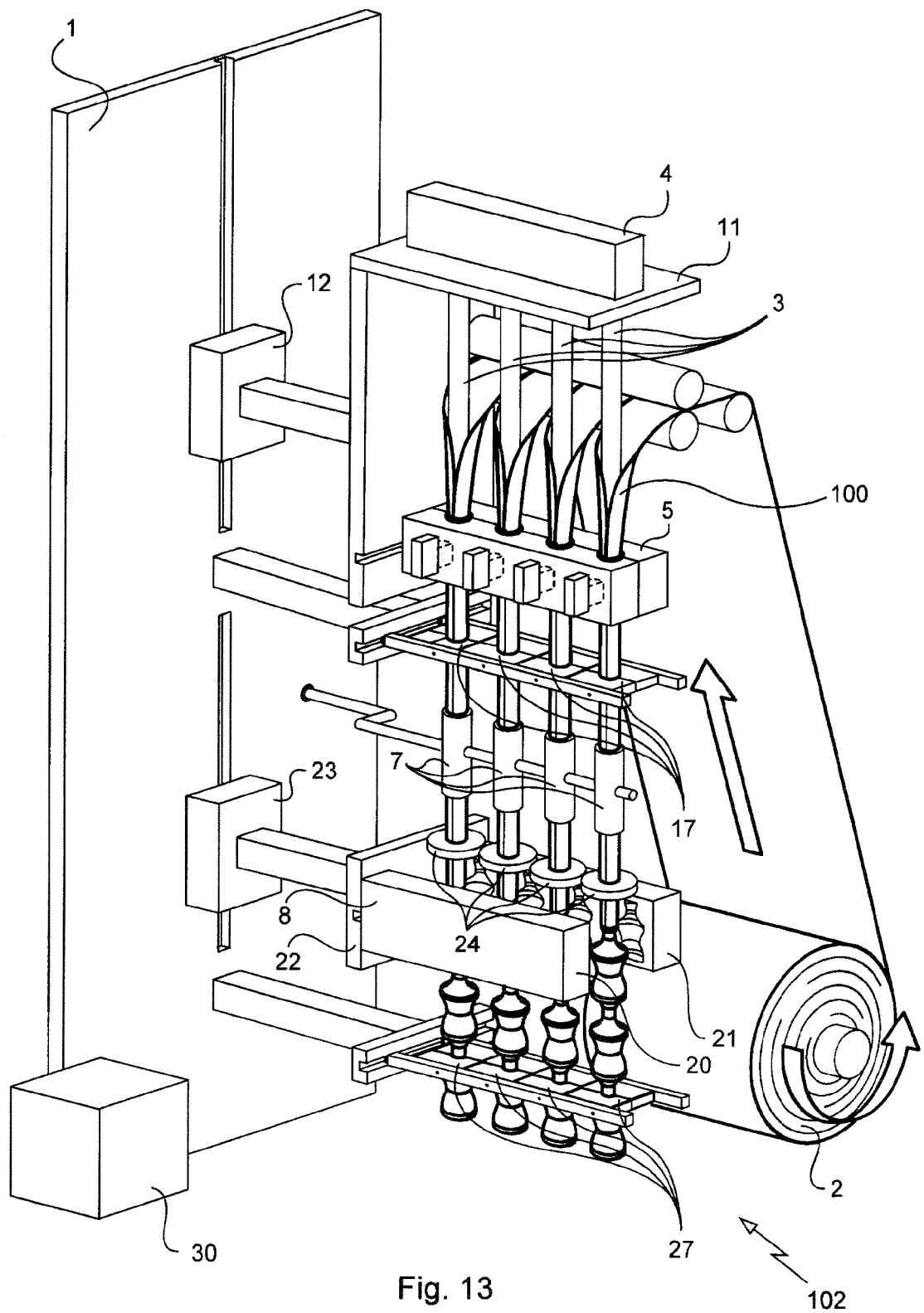
FIG. 13 is a view analogous to FIG. 1 showing a machine in a third embodiment of the invention.

The third embodiment shown in FIG. 13 is analogous to the first embodiment, except in that a clamp 27 is added that is mounted under the mold 8 in order to take hold of the shaped containers that have not been detached from the strip shaped as a tube, thereby enabling the strip shaped as a tube to be held axially when the mold 8 is opened and the first frame is raised from its downstream position towards its upstream position.

The presser 17 is controlled to hold the strip shaped as a tube on opening of the shaper during the relative movement between the strip shaped as a tube and the guide pipe. The clamp 27 is controlled to hold the container during the relative movement of the mold.

Naturally, the invention is not limited to the embodiment described but covers any variant coming within the ambit of the invention as defined by the claims.

In particular, the guide pipe may be of a shape that is different from that described. The ducts may be in the form of tubes that are adjacent to one another instead of being coaxial. The guide pipe needs not have a go-and-return channel if there is no need to provide temperature regulation.

The presser 17 may be in the form of a wheel mounted to pivot relative to the first frame. The wheel may be stationary in translation relative to the first frame, e.g. by being provided with a freewheel or overrunning clutch so that the wheel 17 is prevented from rotating when the first frame 11 is taken from its upstream position towards its downstream position in order to entrain therewith the strip shaped as a tube, but is capable of rotating when the first frame 11 is returned from its downstream position towards its upstream position in order to run along the strip shaped as a tube.

In a variant, the presser 17 may be mounted on a movable frame while the guide pipe and the shaper are secured to the mount.

The mount may be arranged to extend horizontally.

The roll of strip may be allowed to rotate freely or it may be rotated by an actuator controlled by the control unit. The strip shaped as a tube may have the same width of the roll, or the strip as unrolled from the roll may be cut longitudinally in order to form a plurality of strips. The machine then has two parallel lines for forming containers in each of the strips cut from the unrolled strip.

When the machine has a plurality of blow-molding units, it has one compensation actuator per blow-molding unit and the movable components of each blow-molding unit have movements of amplitude that can be adjusted independently from the other blow-molding units in order to synchronize the advance of the cut-out strips.

The machine may have one or more heater members: for example it may have a preheater member mounted upstream from the heater member.

The containers may be filled in the blow-molding machine or on a distinct filling machine.

The invention may be used for fabricating hollow articles in general and not only for fabricating containers.

The invention claimed is:

1. A machine for blow-molding articles from a strip of material, the machine comprising:
   a mount having mounted thereon in succession along a rectilinear path of the strip through the machine:
      a guide pipe coaxial about a longitudinal direction of the strip;
      a shaper arranged around the guide pipe to bring the longitudinal edges of the strip close to each other in order to shape the strip into a tube around the guide pipe;
      a welder member for welding together adjacent edges of the strip shaped as a tube;
      at least one heater member for heating the strip; and
      a mold having two portions movable relative to each other;
   wherein the machine includes a device for driving the strip along its longitudinal direction and a blower member connected to an air manifold member for deforming the tube inside the mold and for pressing the tube against a cavity of the mold;
   wherein the blower member, the welder member, the heater member, the mold, and the drive device are connected to a control unit for controlling them; and
   wherein the drive device comprises at least one member for longitudinally holding the strip and two frames mounted on the mount and each connected to a movement actuator so as to be movable along the path of the strip, each being movable between an upstream position and a downstream position relative to a movement direction of the strip through the machine, and in that the pipe, the holder member, and the mold are respectively mounted on one item selected from the mount and the frames, and the control unit is connected to the movement actuators to control them in such a manner as to generate a sequence of moving the guide pipe and the mold relative to the holder member and of opening and closing the mold in such a manner as to cause the strip to advance along the rectilinear path.

2. A machine according to claim 1, wherein the guide pipe is secured to the first frame, the holder member is secured to the mount, and the mold is secured to the second frame, the control unit being arranged in such a manner that:

the first frame and the second frame are taken simultaneously from their upstream positions towards their downstream positions after closure of the mold;

the first frame is returned towards its upstream position before the mold is opened; and the second frame is returned towards its upstream position after the mold is opened.

3. A machine according to claim 2, wherein the shaper member is mounted on the first frame.

4. A machine according to claim 2, wherein the holder member includes at least one presser mounted on the mount to be movable transversely relative to the guide pipe between an application position for applying the strip shaped as a tube against the guide pipe, and a release position spaced apart from the strip shaped as a tube.

5. A machine according to claim 2, wherein the heater member is mounted on the second mount immediately above the mold.

6. A machine according to claim 1, wherein the guide pipe incorporates longitudinally a go-and-return channel having an inlet and an outlet connected to a temperature regulator device including a heat transfer fluid circuit.

7. A machine according to claim 6, wherein the heat transfer fluid is an oil.

8. A machine according to claim 6, wherein the heat transfer fluid is air.

9. A machine according to claim 6, wherein a temperature probe connected to the temperature regulator device is secured to the guide pipe.

10. A machine according to claim 1, wherein the guide pipe is connected to the air manifold member in order to form the blower member.

11. A machine according to claim 6, wherein the guide pipe includes a central duct connected to the blower member and the go-and-return channel comprises two annular ducts that are coaxial about the central duct.

12. A machine according to claim 10, including a sealing element between the strip shaped as a tube and the guide pipe at the inlet of the mold.

13. A machine according to claim 12, wherein the sealing element is a diaphragm.

14. A machine according to claim 10, including compensation means for compensating a volume left empty in the strip shaped as a tube during movement of the guide pipe relative to the strip shaped as a tube.

15. A machine according to claim 14, wherein the compensation means comprise an actuator having one end connected to the mount, one end connected to the first frame, and a chamber connected to the air manifold member in such a manner that the relative movement between the guide pipe and the holder member causes a volume of air to be injected into the tube that is substantially equal to the volume left empty in the strip shaped as a tube during the movement of the guide pipe.

16. A machine according to claim 1, wherein the blower member comprises a hollow needle having one end connected to the air manifold member and a pointed end projecting into a mold portion in order to pierce the tube on closing the mold.

17. A machine according to claim 10, wherein the guide pipe includes a central duct connected to the blower member and the go-and-return channel comprises two annular ducts that are coaxial about the central duct.

* * * * *